United States Patent
Stewart et al.

(10) Patent No.: US 6,237,823 B1
(45) Date of Patent: May 29, 2001

(54) HITCH SUPPORTED CARRIER FOR A VEHICLE

(75) Inventors: James R. Stewart, Lake Oswego; Ryan K. Cox, Sherwood, both of OR (US)

(73) Assignee: Ironwood Pacific, Inc., Lake Oswego, OR (US)

( * ) Notice: Subject to any disclaimer, the term of this patent is extended or adjusted under 35 U.S.C. 154(b) by 0 days.

(21) Appl. No.: 09/495,691

(22) Filed: Feb. 1, 2000

(51) Int. Cl.[7] ........................................... B60R 9/06
(52) U.S. Cl. .................... 224/509; 224/282; 224/519; 224/523
(58) Field of Search ................... 224/509, 502, 224/282, 519, 523

(56) References Cited

U.S. PATENT DOCUMENTS

| | | | |
|---|---|---|---|
| 4,771,926 | * | 9/1988 | Anderson et al. ................. 224/42.13 |
| 4,971,237 | * | 11/1990 | Davis ................................. 224/42.06 |
| 5,038,983 | * | 8/1991 | Tomososki ........................ 224/42.43 |
| 5,439,151 | * | 8/1995 | Clayton ................................. 224/509 |
| 5,544,799 | * | 8/1996 | Didlake ................................. 224/502 |
| 5,560,525 | * | 10/1996 | Grohmann et al. .................. 224/310 |
| 5,845,832 | * | 12/1998 | Eichmann ............................ 224/509 |
| 5,881,937 | * | 3/1999 | Sadler ................................... 224/509 |

* cited by examiner

*Primary Examiner*—Stephen P. Garbe
(74) *Attorney, Agent, or Firm*—James D. Givnan, Jr.

(57) ABSTRACT

The carrier includes a main member supported rearwardly adjacent a vehicle by a coupler of the carrier inserted into the receiver of a vehicle mounted trailer hitch. The main member includes a curved portion extending transversely and rearwardly away from a straight segment of the main member disposed transversely of the vehicle-centerline. A swing arm is carried by a pivot at the extremity of the curved portion of the main member. A plate on the swing arm carries a lock assembly for securing the swing arm to and in parallel relationship with the main member during travel. A safety lanyard prevents accidental displacement of a locking pin inserted into the main member. The pivot is located adjacent the swing arm supported container and avoids extreme forces being imparted to the main member both in the travel position and a remote position permitting access to the rear of the vehicle.

4 Claims, 2 Drawing Sheets

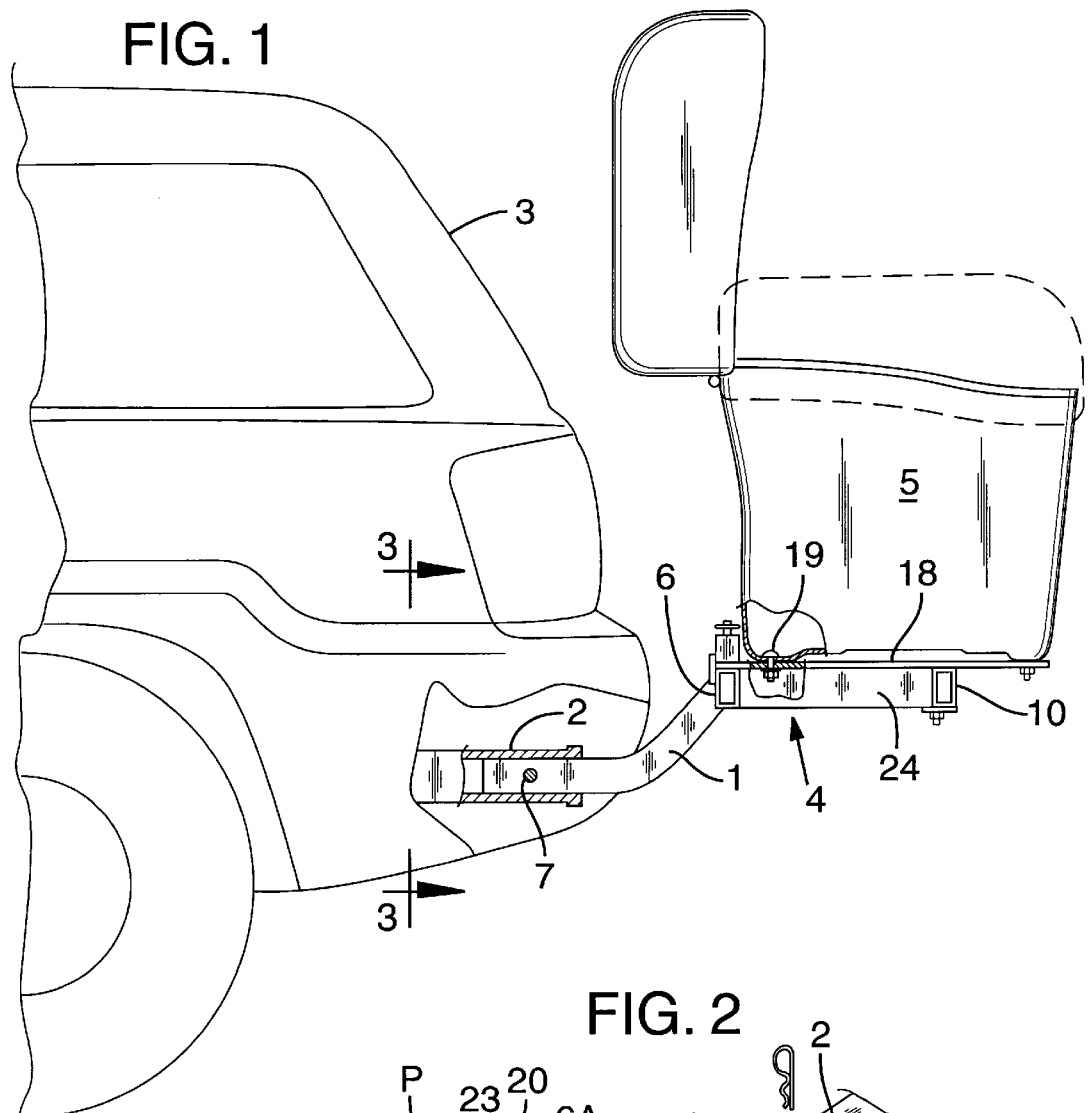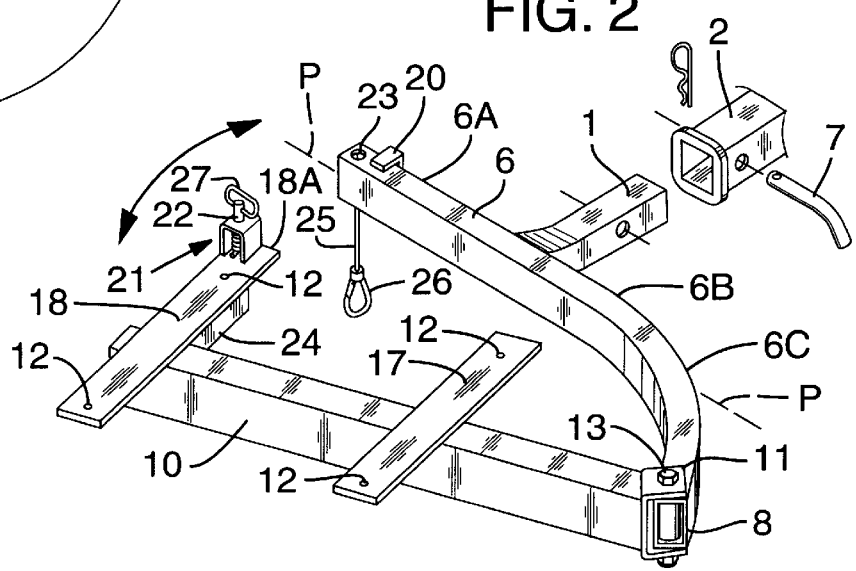

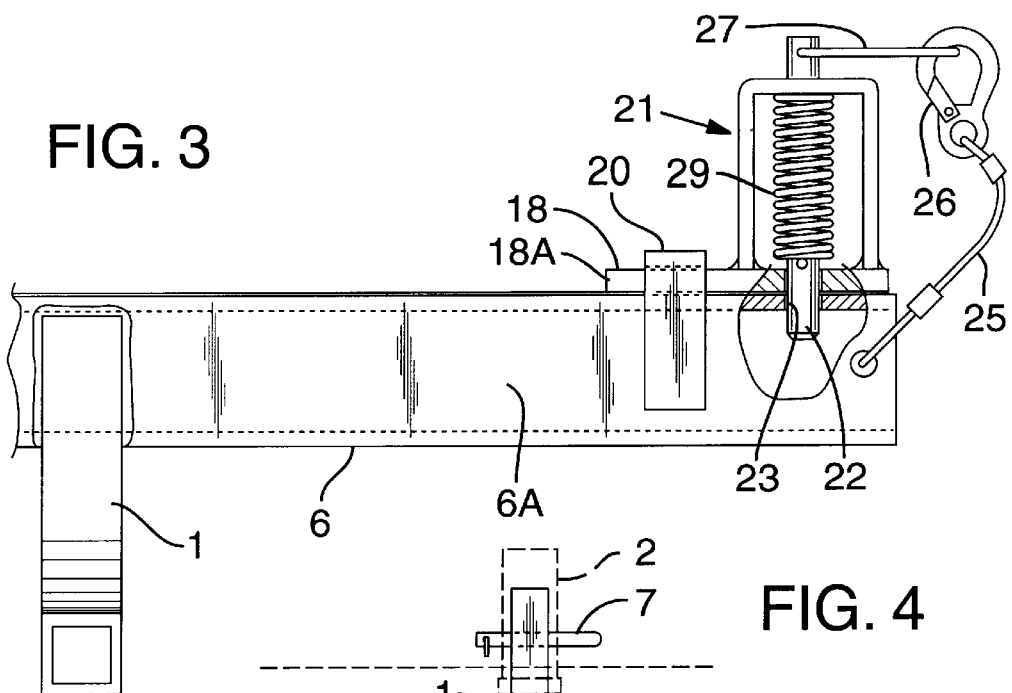
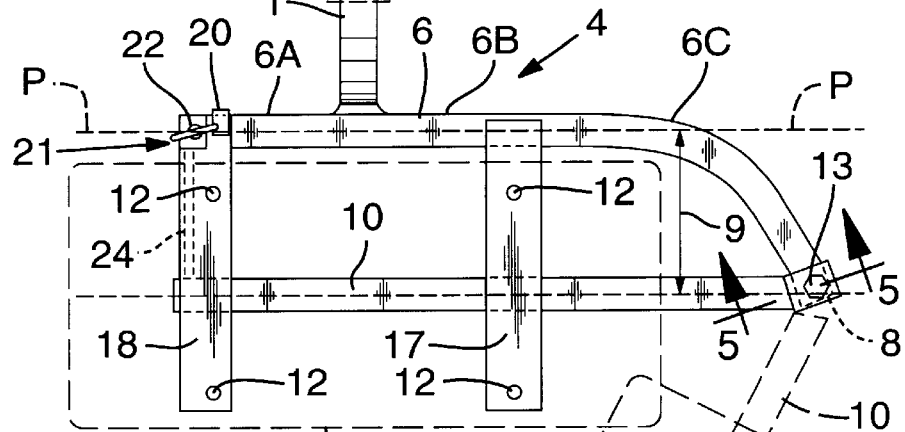
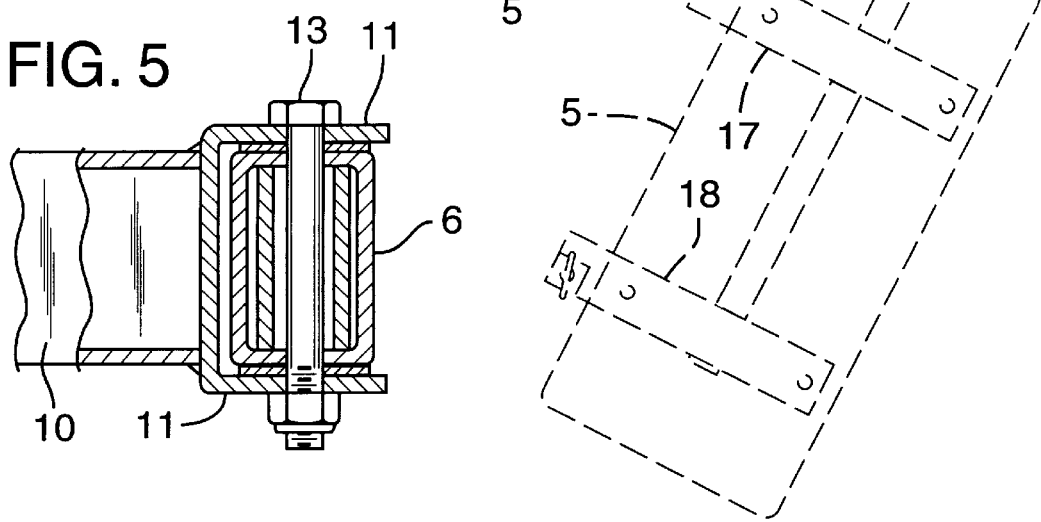

HITCH SUPPORTED CARRIER FOR A VEHICLE

BACKGROUND OF THE INVENTION

The present invention concerns that type of cargo carrier supported by a vehicle mounted hitch with a load receiving container swingably positionable to permit access to the rear of the vehicle.

The prior art discloses a number of hitch supported carriers for use primarily on sports utility vehicles to supplement their load g capability. Typically such carriers are detachably engaged with a permanent hitch member of the vehicle and include a closed container mounted in place on a swingable arm assembly to permit access to the load carrying rearward portion of the vehicle. The enclosed containers of such carriers are sizeable and may be subjected to loads up to several hundreds of pounds of cargo. Substantial loads are accordingly imparted to the swingable member of the carrier and the support structure therefor both when the container is in the travel position as well as when swung outwardly from the vehicle for vehicle access purposes. Dynamic loading of such carriers encountered when the vehicle is under way subjects the carrier to even more significant loading in conjunction with laterally directed forces encountered during vehicle travel.

In the prior art, U.S. Pat. No. 5,544,799 discloses a vehicle mounted carrier having a container supporting, swingable arm pivotally supported at one end in a channel segment supported by an arm extending in parallel fashion toward the center line of the vehicle for securement to a hitch insert When the swing arm and cargo carrier thereon are swung rearwardly away from the vehicle considerable load and torque are imparted to the lengthy support arm at its distal end.

U.S. Pat. No. 5,439,151 discloses a carrier having a load container supported by a U-shaped member having upper and lower bracket members coupled to a crosswise member of the carrier by a pivot pin. Substantial loading of the carrier cross member occurs upon the loaded container being swung away from the vehicle and supported in a cantilever manner by the bracket plates and pivot pin at the distal end of the cross member.

U.S. Pat. No. 5,038,983 discloses a carrier attachment for a vehicle wherein a load container is supported on a platform which in turn is supported by a Z-shaped support member terminating forwardly in inserted engagement with a vehicle mounted receiver of a trailer hitch. No provision is made for swingably displacing the carrier away from the rear of the vehicle.

SUMMARY OF THE PRESENT INVENTION

The present invention is embodied within a hitch mounted load carrier having a main member for parallel disposition to the rear of a supporting vehicle and with a rearwardly directed portion having a distal end supporting a swingable arm member on which is carried a load container and which is additionally supported by the remaining end of said main member when in a travel position. The swingable arm of the carrier moves through 180 degrees enabling fill access to the rear of the vehicle and away from traffic to permit safe access to container contents. A clevis arrangement insures adequate support for the load supporting swingable arm both in the travel and vehicle access positions. Clevis components engage surface areas of the main member providing substantial strength to the swigable arm of the carrier. When in position for travel the swing arm is additionally supported by a forwardly extending plate in rested engagement with the main member and locked thereto to prevent movement in any direction relative the main member.

Important objectives of the present invention include the provision of a load carrier supported by a vehicle mounted trailer hitch with the carrier having a rearwardly directed main member and terminating in support of the swingable arm in a manner without reliance on a lengthy clevis plate weldment imparting severe tortional loading to the rack main member and hence capable of supporting a load of several hundred pounds without distortion of carrier components in the travel or vehicle access positions.

A further object of the present invention is the provision of a swingable arm and member having upper and lower plates which at all times are in virtually full surface engagement with upper and lower surfaces of the distal end of the main member to provide adequate support of the swingable arm when the container thereon is fully loaded.

The provision of a load carrier for a vehicle wherein the swingable container supporting arm member is rigidly locked at two remote locations to confine the swingable arm member and load container therein against movement relative the carrier main member.

BRIEF DESCRIPTION OF THE DRAWINGS

In the drawings:

FIG. 1 is a partial side elevational view of a vehicle with the present carrier supported thereon in a travel position;

FIG. 2 is a perspective view of the carrier with a swingable arm thereof offset rearwardly from a travel or closed position for purposes of illustration;

FIG. 3 is a vertical elevational view taken along line 3—3 of FIG. 1 disclosing lock details.

FIG. 4 is a plan view of the carrier;

FIG. 5 is a vertical sectional view of pivot means taken along line 5—5 of FIG. 4.

DETAILED DESCRIPTION OF THE PREFERRED EMBODIMENTS

With continuing attention to the drawings wherein parts are identified by reference numerals are similarly hereinafter identified, the reference numeral 1 indicates an elongate coupler of box beam construction for inserted engagement with the receiver 2 of a trailer hitch on the frame of a vehicle 3.

The coupler is part of the present carrier indicated generally at 4 having an openable container at 5 providing storage space for the transport of assorted items to supplement the storage capability of the vehicle. A locking pin 7 retains the coupler in hitch engagement.

Coupler 1 extends rearwardly and upwardly from the hitch receiver 2 for welded securement to a main support member at 6 of the carrier. Main member 6 is of box beam stock having a first segment 6A located in a first vertical plane P and disposed normal to coupler 1. A second segment 6B of the main member is denoted by the lengthwise center line of coupler 1. The second segment 6B includes a rearwardly curved portion 6C extending rearwardly from a vertical plane P. The curved portion 6C of main member 6 terminates at a distal end 8 approximately a foot or so at 9 rearwardly offset in a second vertical plane from vertical plane P containing first segment 6A of the main member.

Carried by said second segment of the main member is a swing arm 10 fitted at its proximal end with a clevis 11 for bolted pivotal engagement at 13 to main member segment 6B. The swing arm is adapted for rotation about the upright axis of a bolt assembly 13 from a vehicle travel position shown in full lines in FIG. 4 to a rearward or temporary position (not shown) through 180 degrees allowing full unobstructed access to the rear of vehicle 3. Further, the temporary position, i.e., 180 degrees from the full line position of FIG. 4, permits relocating a load receiving container 5 allowing the user to be located at the road shoulder or adjacent the road. Transversely disposed plates 17–18 are welded to the swing arm and apertured at 12 to receive fastener assemblies 19 extending through the bottom of the load container securing same to the plates. The swing arm and container thereon are additionally supported, when in a travel or fill line position shown in FIG. 4, by the forward end 18A of plate 18 insertably engaging a hold down ear 20 on main member 6 while a lock assembly generally at 21 on the plate automatically seats a lock pin 22 within an aperture 23 in the main member. A cable safety lanyard at 25 is tethered to carrier main member 6 and includes a snap hook 26 engaged with a ring 27 on lock pin 22 to confine same in inserted engagement with main member 6 until detached from the ring and lifted against the action of spring 29. A limit stop at 24 depends from the underside of arm 18 and normally abuts the main member for added strength against forwardly exerted loads.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

What is claimed is:

1. A load carrier for attachment to the rear end of a vehicle, sad carrier comprising, a coupler for engagement in a forward direction with a vehicle mounted support, a box beam member supported by said coupler and having a first segment in a vertical plane normal to the axis of said coupler and merging with a second segment having a horizontal curved portion projecting in a rearward direction away from said coupler and away from the vertical plane containing said first segment and terminating in a second vertical plane, a swing arm parallel to said first segment and having a proximal end located in said second vertical plane, a container on said swing arm, pivot means in said second vertical plane and coupling said proximal end of the swing arm to said second segment of the box beam member, and plate means on the swing arm for supporting the load container when in a vehicle travel position, said plate means for rested engagement with the box beam member when in a vehicle travel position.

2. The load carrier claimed in claim 1 wherein said swing arm, when in a forward position for vehicle travel lies in a second vertical plane in parallel with said first vertical plane, said pivot means located in said second vertical plane.

3. The load carrier claimed in claim 1 additionally including a hold down clip on said main member for overlying engagement with said plate means.

4. The load carrier claimed in claim 3 additionally including a lock assembly in place on said plate means, said assembly including a spring biased locking pin insertable into said main member, a safely tether on said main member and attached to said locking pin to prevent upward pin disengagement from the main member during vehicle travel.

* * * * *